US006218743B1

(12) United States Patent
Hayashi et al.

(10) Patent No.: US 6,218,743 B1
(45) Date of Patent: Apr. 17, 2001

(54) STARTING APPARATUS FOR VEHICLE HAVING ELECTRONICALLY CONTROLLED CLUTCH

(75) Inventors: Masahiko Hayashi; Junichi Imai; Kazuhiko Kobayashi; Hiroyuki Arai, all of Kanagawa (JP)

(73) Assignee: Isuzu Motors Ltd, Tokyo (JP)

( * ) Notice: Subject to any disclaimer, the term of this patent is extended or adjusted under 35 U.S.C. 154(b) by 0 days.

(21) Appl. No.: 09/255,879

(22) Filed: Feb. 23, 1999

(30) Foreign Application Priority Data

Feb. 26, 1998 (JP) .................................................. 10-064141

(51) Int. Cl.[7] .................................................. B60K 17/28

(52) U.S. Cl. ........................ 307/10.6; 200/61.28; 477/99; 477/174; 477/181

(58) Field of Search .............................. 307/10.6; 440/85; 477/174, 180, 181, 99; 340/531; 200/61.28, 61.88

(56) References Cited

U.S. PATENT DOCUMENTS 4,651,018 * 3/1987 Peterson .............................. 307/10.6
5,144,300 * 9/1992 Kanno ................................ 307/10.6
5,252,861 * 10/1993 Steeby et al. .......................... 477/99
5,562,173 * 10/1996 Olson .................................. 477/174
5,614,883 * 3/1997 Dery et al. ........................... 307/10.6

* cited by examiner

*Primary Examiner*—Albert W. Paladini
(74) *Attorney, Agent, or Firm*—Jones, Tullar & Cooper, P.C.

(57) ABSTRACT

A starting apparatus for starting an engine only under constant conditions includes an electronically controlled clutch which is engaged or disengaged by an actuator in accordance with output signals from various detectors. The detectors sense a driving state, wherein a starter cut relay having normally-closed contacts is connected to an output terminal of an electronic control unit. One of the contacts of the starter cut relay is connected to one end of a relay coil for a starter relay. The other end of the relay coil is connected to a power source through a key switch. The other contact of the starter cut relay is connected to a non-grounded side contact of a neutral relay which is connected to the power source.

3 Claims, 3 Drawing Sheets

STARTING APPARATUS FOR VEHICLE HAVING ELECTRONICALLY CONTROLLED CLUTCH

TECHNICAL FIELD OF THE INVENTION

The present invention relates to a starting apparatus in a vehicle for engaging and disengaging a clutch by an actuator which is electronically controlled in accordance with output signal from various detection means which detect the driving states.

SUMMARY OF THE INVENTION

In a vehicle having the above-described automatic control unit for automatically controlling the clutch to engage or disengage in accordance with the driving state of the vehicle based on the output signal from the above-described various state detecting means, it is an object of the present invention to provide a starting apparatus capable of safely starting the engine only under a constant condition, capable of starting the engine even when the control unit is repaired, and capable of finding the trouble of the related detecting means, in view of the automating tendency of the vehicle clutch.

To achieve the above object, there is provided a starting apparatus for a vehicle having an electronically controlled clutch in which the clutch is engaged or disengaged by an electronically controlled actuator in accordance with output signals from various detecting means for detecting driving state, wherein a starter cut relay having normally-closed contacts is connected to an output terminal of an electronic control unit, one of the contacts of the relay is connected to one end of a relay coil of a starter relay connected at the other end of said relay coil to a power source through a key switch, and the other contact of the cut relay is connected to a non-grounded side contact of a neutral relay connected to the power source in series together with a neutral switch.

BRIEF DESCRIPTION OF THE DRAWINGS

The foregoing and other objects and features of the invention will be understood from the following detailed description of a preferred embodiment thereof, taken with the accompanying drawings, in which.

DESCRIPTION OF PREFERRED EMBODIMENT

Figure 3:
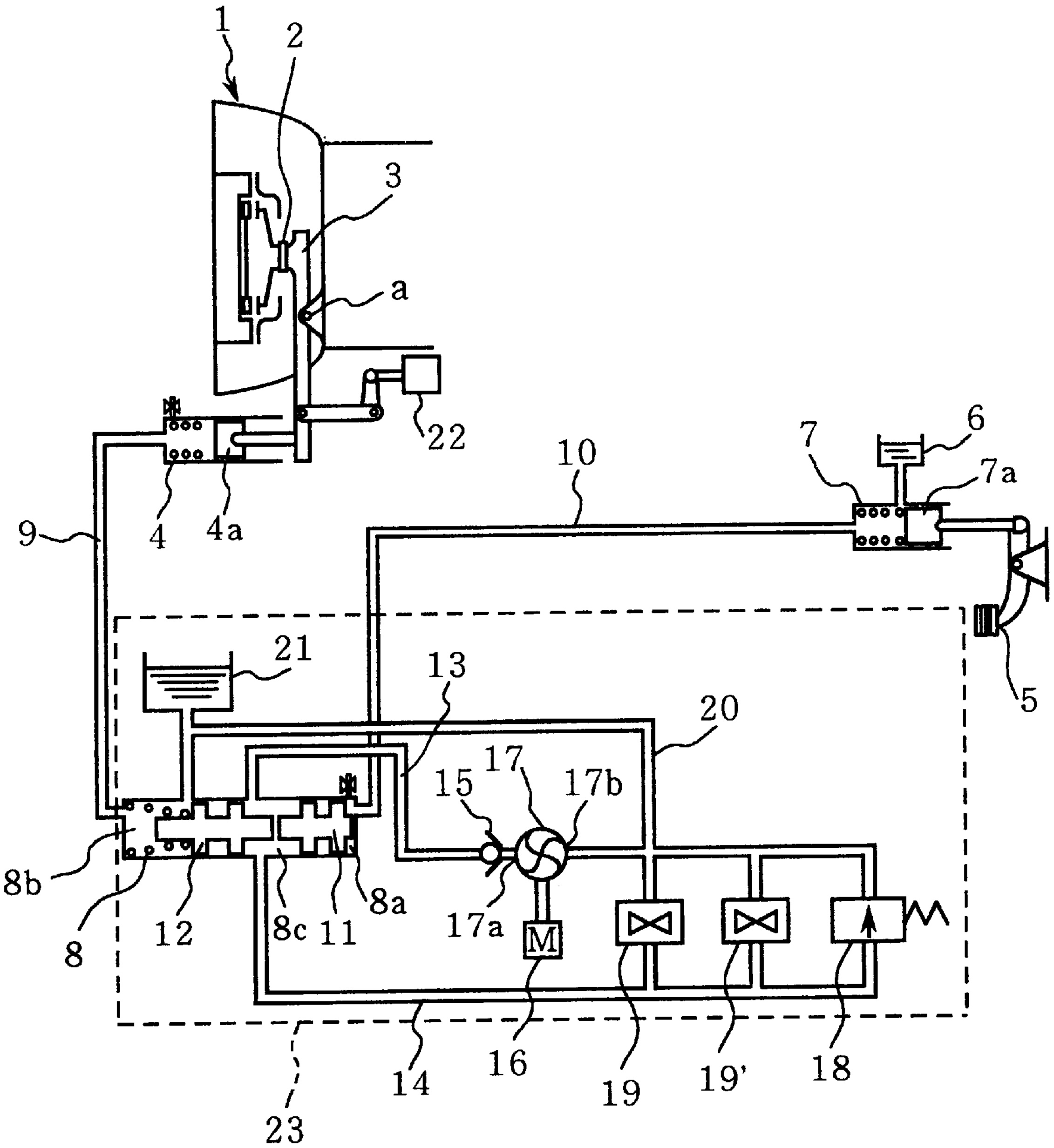
FIG. 3 is a view entirely showing one example of an automatic clutch apparatus for a vehicle.

In accordance with the present invention, a vehicle includes a transmission which is manually operated, with;

In a vehicle, a transmission being manually operated, and only the clutch is basically engaged or disengaged automatically in accordance with the state of the transmission and the driving state, and with the clutch also being designed such that the clutch can be operated manually when the driver desires or when the clutch can not be operated automatically. FIG. 3 shows such an automatic clutch apparatus for a vehicle.

That is, in this apparatus, an intermediate cylinder 8 is disposed between a slave cylinder 4 connected to one end of a clutch release fork 3. The fork 3 is turned around a fulcrum "a" by cylinder 4, as illustrated in FIG. 3 and the other end of the fork pushes a release bearing 2 of a friction clutch 1 and a master cylinder 7 having an oil tank 6 is operated by pedaling a clutch pedal 5. A left end and a right end of the intermediate cylinder 8 are connected to the slave cylinder 4 and the master cylinder 7 through pipes 9 and 10, respectively. In the intermediate cylinder 8, a first piston 11, provided at its opposite ends with projections, is formed at the side of the master cylinder 7, and a second piston 12 having the same shape as that of the first piston 11 and longer than the first piston 11 is formed at the side of the slave cylinder 4. In the intermediate cylinder 8, a right chamber **8*a* and a left chamber 8*b* are defined by the first and second pistons 11 and 12 respectively. The intermediate cylinder 8 has two openings which are respectively through a check valve 15 connected, through pipes 13 and 14 respectively, to an oil feed port 17*a* of a hydraulic pump 17 which is rotated by a motor 16 and through a relief valve 8 to an intake port 17*b*. Further, solenoid valves 19 and 19' bypassing the pipe 14 are connected, through a pipe 20, to an oil tank 21 which is also connected to the left chamber 8*b* of the intermediate cylinder 8. The reference number 22 represents clutch stroke detecting means for detecting the movement of the clutch release fork 3**.

A clutch hydraulic actuator 23 comprises the intermediate cylinder 8 having the oil tank 21, the hydraulic pump 17 rotated by the motor 16, the check valve 15, the relief valve 18, the solenoid valves 19, 19' and the pipes 13, 14 and 20.

Figure 1:
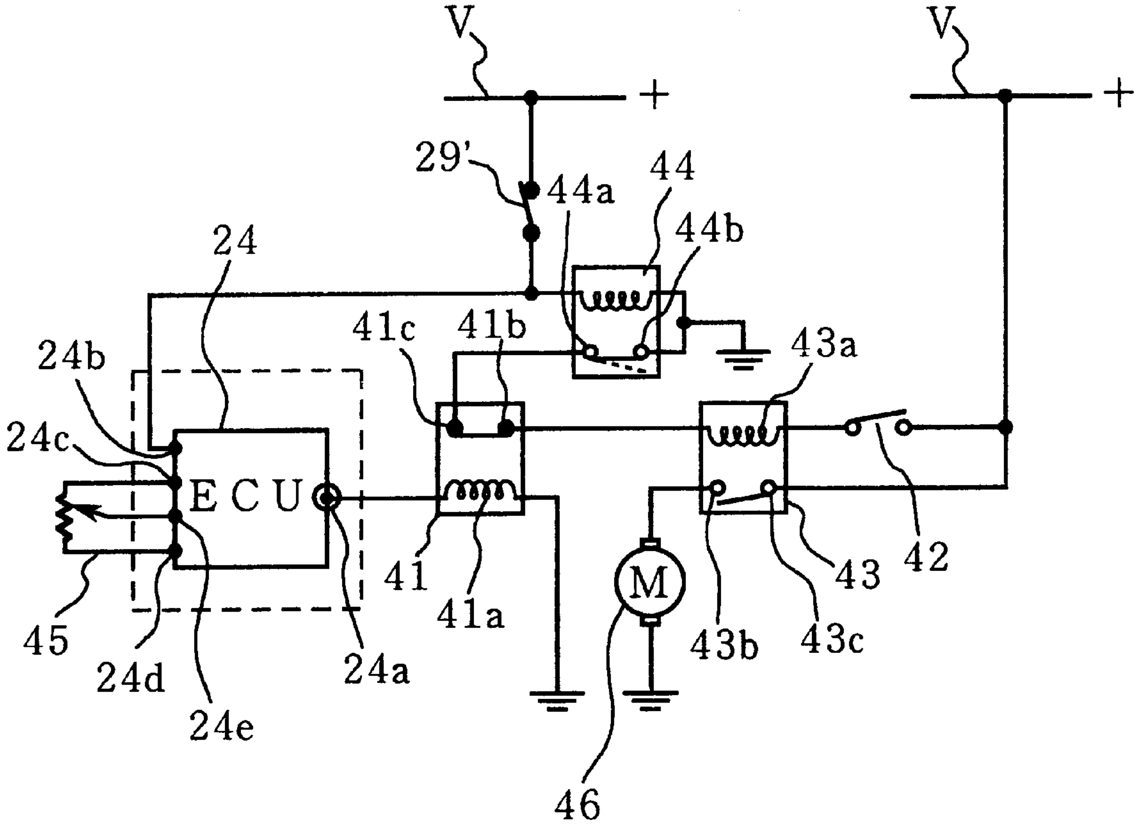
FIG. 1 is one example of a circuit diagram of a starting apparatus of a vehicle having an electronic control clutch of the present invention.
Figure 2:
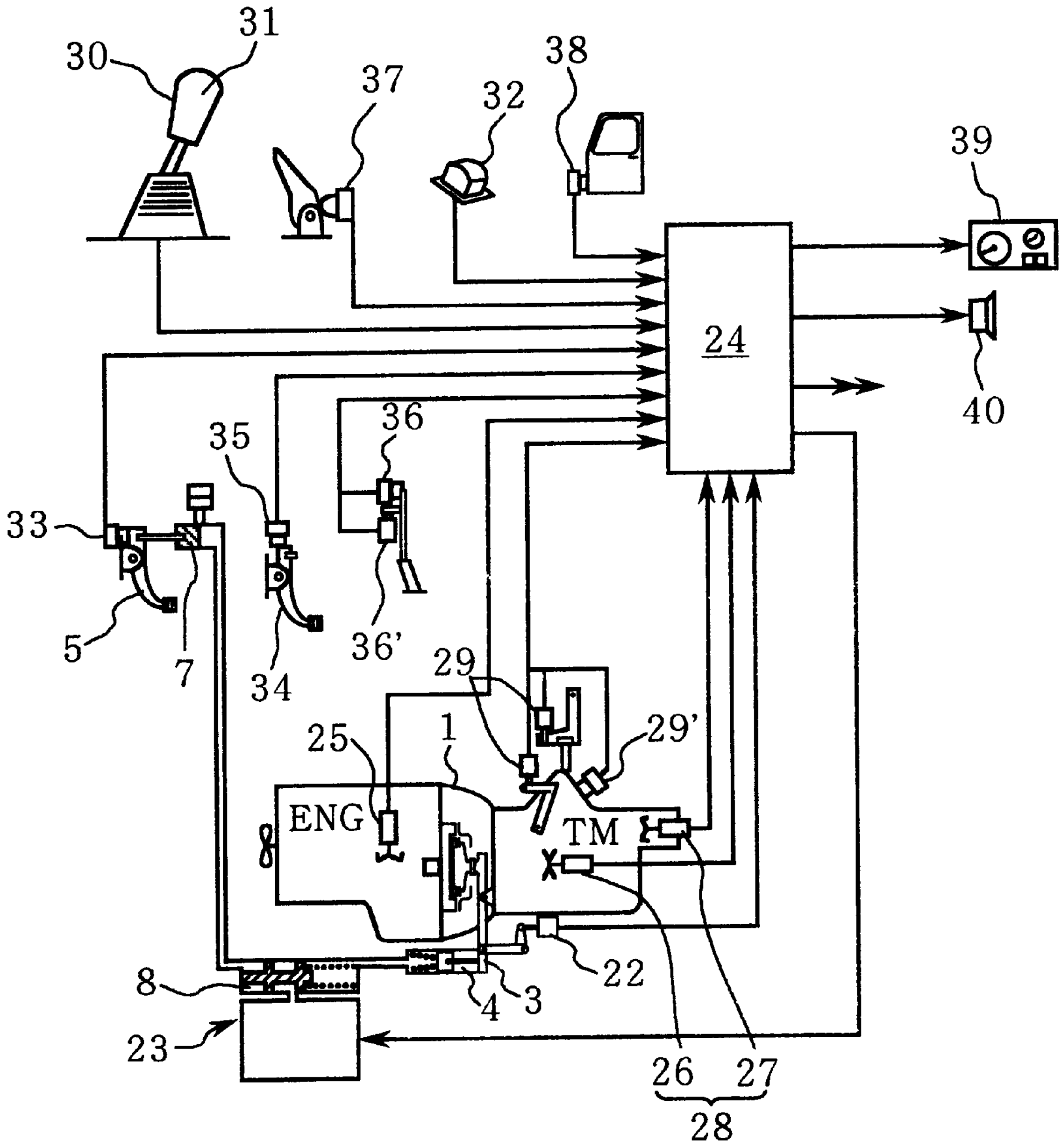
FIG. 2 is a view showing a control system in a vehicle to which the starting apparatus for the vehicle having an electronic control clutch of the present invention should be applied.

FIG. 2 shows a control system for an automatic clutch apparatus for the vehicle shown in FIG. 3 (and FIG. 1). In FIG. 2, the reference number 24 represents a clutch automatic control unit. Connected to the input side of the clutch automatic control unit 24 are the clutch stroke detecting means 22, engine revolution number detecting means 25 for detecting the revolution number of an engine ENG, vehicle speed detecting means 28 such as a transmission revolution sensor 26 and a vehicle speed sensor 27 for detecting a vehicle speed, gearshift position detecting means 29 for detecting the gearshift position, a neutral switch 29' for detecting the neutral position, shift knob grasp detecting means 31 for sensing the grasp of a shift knob 30 to detect a will or an action of gear shifting, a clutch automating switch 32 for detecting a will to automate the clutch, a clutch pedal switch 33 having detecting means for detecting the pedaling operation used for switching from automatic operation to manual operation, brake detecting means 35 mounted to a brake pedal 34 for detecting the braking operation, an accelerator switch 36 for detecting the pedaling operation and its pedaling amount, accelerator opening degree detecting means 36' and, various detecting means such as parking brake detecting means 37 for detecting the operation of the parking brake. In addition to these, means 38 for detecting the opening of a door is also connected to the input side of the unit 24.

On the other hand, the output side of the clutch automatic control unit 24 is connected to the clutch hydraulic actuator 23, an indicator lamp 39 for displaying various states, a warning mechanism 40 such as a buzzer, and a controller (not shown) of the engine.

FIG. 3 shows a state in which hydraulic pressure is applied to the slave cylinder 4 and the friction clutch 1 is engaged. From this state, if the gearshift is brought into neutral and the engine is started, and the automating switch 32 is turned ON (automatic) and the shift knob 30 is grasped to turn the shift knob grasp detecting means 31 ON to change the gear, the hydraulic pump 17 is rotated by the motor 16 to increase the hydraulic pressure, and the check valve 15 is opened to send the oil into the intermediate chamber 8*c* of the intermediate cylinder 8 through the pipe 13. With this operation, the second piston 12 is pushed toward the left chamber 8*b* and the oil in the left chamber 8*b* is sent to the slave cylinder 4 through the pipe 9. Therefore, the clutch release fork 3 is turned in the counterclockwise direction around the fulcrum a through the piston 4*a,* thereby pushing the release bearing 2 leftward to disengage the friction clutch 1. If the clutch stroke detecting means 22 detects that the piston 4*a* moves through a predetermined stroke, the power source to the motor 16 is cut to stop the rotation of the hydraulic pump 17.

In the process for disengaging the clutch 1 from its engaged state, among the oil sent from the hydraulic pump 16 to the intermediate chamber 8*c* of the intermediate cylinder 8, the excessive amount of oil pushing the second piston 12 is sent to the oil tank 21 through the solenoid valves 19 and 19' and through the pipe 20.

After the power source to the motor 16 is cut to stop the hydraulic pump 17, if the solenoid valves 19 and 19' are opened while controlling the valves so as to adjust the returning speed of the oil, the oil in the slave cylinder 4 moves in the pipe 9 and enters into the left chamber of the intermediate cylinder 8 by the returning movement of the piston 4*a* leftward in FIG. 3 through the clutch release fork 3, so that the second piston 12 which was located at left side is pushed to the right side position in FIG. 3. Therefore, the oil in the intermediate chamber 8*c* is returned from the pipe 14 to the oil tank 21 through the solenoid valves 19 and 19' and through the pipe 20. At that time, the solenoid valves 19 and 19' are, e.g., duty-controlled, so that the friction clutch 1 is engaged while controlling the returning speed of the second piston 12.

In FIG. 3, if the clutch pedal 5 is depressed, the oil in the master cylinder 7 is pushed leftward as viewed in FIG. 3, and is introduced into the right chamber 8*a* of the intermediate cylinder 8 through the pipe 10, thereby pushing the first piston 11. Therefore, the first piston 11 pushes, through its projections, the second piston 12 leftward as viewed in FIG. 3, the second piston 12 sends the oil in the left chamber 8*b* into the slave cylinder 4, thereby turning the clutch release fork 3 around the fulcrum a in the counterclockwise direction through the piston 4*a* so that the release bearing 2 is pushed leftward to disengage the friction clutch 1. In the process for disengaging the clutch 1 from its engaged state, the oil in the intermediate chamber 8*c* of the intermediate cylinder 8 is returned to the oil tank 21 from the pipe 14 through the solenoid valves 19 and 19' and through the pipe 20.

If the clutch pedal 5 is returned, the piston 7*a* in the master cylinder 7 is returned rightward as viewed in FIG. 3 by a spring in the master cylinder 7, and at the same time, the oil in the slave cylinder 4 is returned to the left chamber 8*b* of the intermediate cylinder 8 through the pipe 9 by the returning movement of the piston 4*a* by a spring in the friction clutch 1 through the release bearing 2 and the clutch release fork 3. The second piston 12 moves, together with the spring force, the first piston 11 rightward as viewed in FIG. 3, so that the friction clutch 1 is engaged.

The present invention will be described in detail based on an example shown in FIG. 1, together with FIGS. 2 and 3. The starting apparatus for the vehicle having the a electronic control clutch of the present invention, which engages and disengages the clutch 1 by the clutch hydraulic actuator 23, electronically controlled in accordance with output signal from the above-described various detecting means which detect the driving state, includes a coil 41*a* of a starter cut relay 41 having normally-closed contacts. The relay is connected to an output terminal 24*a* of the electronic control unit 24, with one of the contacts 41*b* of the relay 41 being connected to one end of a relay coil 43*a* of a starter relay 43 relay 43 is connected at the other end of the relay coil 43*a* to a power source V through a key switch 42. The other contact 41*c* of the cut relay 41 is connected to a non-grounded side contact 44*a* of a neutral relay 44. Relay 44 is connected between a neutral switch 29' connected to the power source and an input terminal 24*b* of the electronic control unit 24. A gear stroke sensor 45, capable of detecting the neutral of the shift operation of the transmission, is connected to input terminals 24*c,* 24*d* and 24*e* of the electronic control unit 24. In FIG. 1, the reference symbols 43*b* and 43*c* represent contacts of the starter relay 43, and the reference symbol 44*b* representing the grounded-side contact of the neutral relay 44.

In the case of the present invention, incorporated in the electronic control unit 24 is logic which does not allow the electric current flow to the coil 41*a* of the starter cut relay 41 when the neutral switch 29' and the gear stroke sensor 45 are normal that is when the neutral switch 29' is ON and the gear stroke sensor 45 indicates that the shift position of the transmission is in the neutral. However, the control unit 24 allows the electric current to flow to the coil 41*a* of the starter cut relay 41 from the output terminal 24*a* of the electronic control unit 24, thereby opening the circuit between the contacts 41*b* and 41*c* so that the starter relay 43 is not operated when any of the neutral switch 29' or the gear stroke sensor 45 is abnormal, the neutral switch 29' is OFF or the shift position of the transmission is in other than the neutral.

As described above, both the neutral switch 29' and the gear stroke sensor 45 are connected to the input terminal 24*b,* 24*c* and 24*d* of the electronic control unit 24. With this arrangement, in the electronic control unit 24, there is also incorporated logic for judging that the shift position is surely in neutral if both the neutral switch 29' and the gear stroke sensor 45 outputs signals indicating that input from the shift position is neutral, and for judging that either one of the neutral switch 29' and the gear stroke sensor 45 is abnormal if signals output from the neutral switch 29' and the gear stroke sensor 45 are different. Therefore, it is possible to judge that either one of the neutral switch 29' and the gear stroke sensor 45 is abnormal.

In the starter apparatus of the present invention having the above-described structure, when the neutral switch 29' and the gear stroke sensor 45 are normal, the neutral switch 29' is ON and the gear stroke sensor 45 indicates that the shift position of the transmission is in the neutral, the neutral relay 44 closes from the dotted line to the solid line, and since no electric current flows to the coil 41*a* of the starter cut relay 41, its contact is kept in its normally-closed state. Therefore, if the key switch 42 is turned ON, the electric current of the power source flows through the key switch 42, the coil 43*a* of the starter relay 43, and flows between the normally-closed contacts 41*b* and 41*c* of the starter cut relay, and between the contacts 44*a* and 44*b* of the neutral relay 44, and is grounded. Therefore, the starter relay 43 closes the circuit between the contacts 44*b* and 44*c* to start the starter motor 46.

Further, when either one of the neutral switch 29' and the gear stroke sensor 45 is abnormal, or when the neutral switch 29' is OFF or the shift position of the transmission is in other than the neutral, the electric current is flowed from the output terminal 24*a* of the electronic control unit 24 to the coil 41*a* of the starter cut relay 41, thereby opening the circuit between the contacts 41*b* and 41*c*. Therefore, even if the key switch 42 is turned ON, since the circuit between the normally-closed contacts 41*b* and 41*c* of the starter cut relay or the circuit between the contacts 44*a* and 44*b* of the neutral relay 44 is opened, the electric current of the power source does not flow, and the starter motor 46 can not be started.

If the electronic control unit 24 should be out of order, and even if the portion within the dotted line is removed for exchanging the electronic control unit 24, according to the starting apparatus of the present invention, as long as the neutral switch 29' is normal, since the switch 29' is ON, the neutral relay 44 is closed from the dotted line to the solid line, and the starter cut relay 41 is kept in its normally-closed state. Therefore, by turning the key switch 42 ON, the electric current of the power source flows through the key switch 42, the coil 43*a* of the starter relay 43, and flows between the normally-closed contacts 41*b* and 41*c* of the starter cut relay, and between the contacts 44*a* and 44*b* of the neutral relay 44, and is grounded in the same manner as that described above. Therefore, the starter relay 43 closes the circuit between the contacts 44*b* and 44*c* so that the starter motor 46 can be started. In this case, it is necessary to operate the clutch 1 manually.

Therefore, in the starting apparatus for a vehicle having the electronic control clutch of the present invention, even if the electronic control unit 24 should be out of order and removed, as long as the neutral switch 29' is normal, since the switch 29' is ON, the neutral relay 44 is closed, and the starter cut relay 41 is kept in its normally-closed state. Therefore, by turning the key switch 42 ON, it is possible to start the starter motor 46 through the starter relay 43, and by manually operating the clutch 1, the vehicle can be used as usual.

In the starting apparatus, if signals from the neutral switch 29' and the gear stroke sensor 45 are included in the output signals of the above-described various detecting means, and if the starting apparatus is designed such that when the electronic control unit 24 judges that the output signals from the neutral switch 29' and the gear stroke sensor 45 are different, the signal is output so as to operate the starter cut relay 41, it is possible to sense the abnormality of the neutral switch 29' and the gear stroke sensor 45.

REFERENCE

1 friction clutch
2 release bearing
3 clutch release fork
4 slave cylinder
5 clutch pedal
6, 21 oil tank
7 master cylinder
8 intermediate cylinder
9, 10, 13, 14, 20 pipe
11 first piston
12 second piston
15 check valve
16 motor
17 hydraulic pump
18 relief valve
19, 19' solenoid valves
22 clutch stroke detecting means
23 clutch hydraulic actuator
24 electronic control unit
25 transmission revolution sensor
26 vehicle speed sensor
27 vehicle speed detecting means
28 vehicle speed detecting means
29 gearshift position detecting means
29' neutral switch
30 shift knob
31 shift knob grasp detecting means
32 clutch automating switch
33 clutch pedal switch
34 brake pedal
35 brake detecting means
36 accelerator switch
36' accelerator opening degree detecting means
37 parking brake detecting means
38 detecting means for the opening of a door
39 indicator lamp
40 warning mechanism
41 starter out relay
42 key switch
43 starter relay
44 neutral relay
45 gear stroke sensor
46 starter motor

What is claimed is:

1. Engine starting apparatus for a vehicle having a transmission and an electronically controlled clutch, comprising;

a master cylinder operated by a clutch pedal, a vehicle friction clutch that is turned ON and OFF by a slave cylinder, a hydraulic clutch actuator connected between said master cylinder and said slave cylinder through a pipe, said hydraulic clutch actuator having an intermediate cylinder, and a hydraulic pump for sending oil under pressure to said intermediate cylinder, said pump being driven by an electric motor operating in response to a signal indicative of a driving state of the vehicle, and a hydraulic control solenoid valve connected to said actuator to release said oil pressure;

an electronic control unit; and a detection means connected to said control unit for detecting a driving state of an engine in the vehicle and the driving state of the vehicle, the detection means at least including a neutral switch and a gear-stroke sensor in the transmission, wherein said electronic control unit carries out a computation based on a signal from said detecting means, and wherein said electronic control unit sends an output signal to operate said electric motor of said hydraulic pump and to operate said solenoid valve when the driving state of the vehicle is in a predetermined state.

2. The engine starting apparatus of claim 1, further including:

a neutral switch connected at a first end to a power source and at a second end to an input terminal of said electronic control unit;

a neutral relay connected to said second end of said neutral switch, said neutral relay having a normally opened contact which is closed when said neutral switch is closed;

a starter cut relay having a normally closed contact having a first end connected to said normally opened contact of said neutral relay, said starter cut relay being connected to receive said control unit output signal to open its normally closed contact in response to said electronic control unit output signal;

a key switch; and a starter relay having a starter relay coil connected at a first end to said power source through said key switch and connected at a second end to said normally closed contact of said starter cut relay;

said starter relay having a normally opened contact which is closed to send current to said starter motor when said key switch is ON.

3. The engine starting apparatus of claim 2, further including;

a vehicle gear shift for the vehicle transmission;

a gear shift position sensor connected to said control unit; and wherein:

said electronic control unit includes logic means to prevent said control unit output signal from flowing to said cut relay coil of said starter cut relay when said neutral switch is ON and said shift position stroke sensor indicates that the shift of said transmission is neutral, and provides a control unit output signal to said cut relay coil of said starter cut relay when any of said neutral switch and gear shift position sensor is in an abnormal condition.

* * * * *